Oct. 7, 1952  R. A. McCONNELL  2,612,772
SUPERSONIC TEST DEVICE
Filed Feb. 14, 1946  2 SHEETS—SHEET 1

INVENTOR
ROBERT A. McCONNELL

BY  *M. O. Hayes*
ATTORNEY

Patented Oct. 7, 1952

2,612,772

UNITED STATES PATENT OFFICE 2,612,772

SUPERSONIC TEST DEVICE

Robert A. McConnell, Cambridge, Mass.

Application February 14, 1946, Serial No. 647,591

12 Claims. (Cl. 73—67)

1

This invention relates in general to supersonic testing devices, and more particularly to supersonic devices for checking the dimensions and internal condition of solid parts.

It is an object of this invention to provide a means for rapid and precise checking of the dimensions and internal condition of solid parts by pulsed supersonic waves.

Other objects and advantages of this invention will be apparent from the following description, accompanied by drawings in which.

Figure 1:
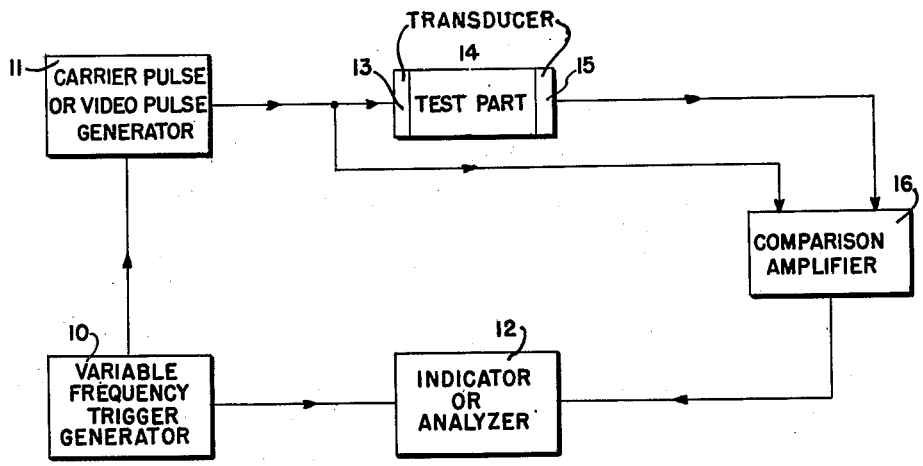
Fig. 1 is a block diagram of an embodiment of this invention.

The embodiment of this invention as shown in Fig. 1 includes a variable frequency trigger generator designated 10. This generator supplies voltage triggers for the synchronization of pulse generator 11 and indicator or analyzer 12. Pulse generator 11 comprises means for generating an approximately rectangular carrier or video pulse of electrical energy. This pulse is applied to one input of comparison amplifier 16 and also to electromechanical transducer 13 (such as a crystal or magnetostriction rod). This transducer converts the electrical pulse to a mechanical or supersonic pulse and projects the pulse through test part 14. After the supersonic pulse has traveled through the test part the supersonic pulse is picked up by transducer 15 which converts the supersonic pulse back to an electrical pulse of the same frequency and applies this pulse to a second input of comparison amplifier 16. The recurrence rate of variable frequency trigger generator 10 is adjusted so that the period is just equal to the time taken by the supersonic pulse to traverse test part 14 (or an integral submultiple of that time) so that a delayed and an undelayed pulse arrive at comparison amplifier 16 at the same time. It will be understood that the time required for a pulse to traverse part 14 is generally greater than the time width of the pulses. Therefore, the leading edge of the second pulse will be spaced from the trailing edge of the first pulse by an interval determined by the length of test part 14 and the velocity of propagation of supersonic pulses in the material of which test part 14 is made.

2

Figure 3:
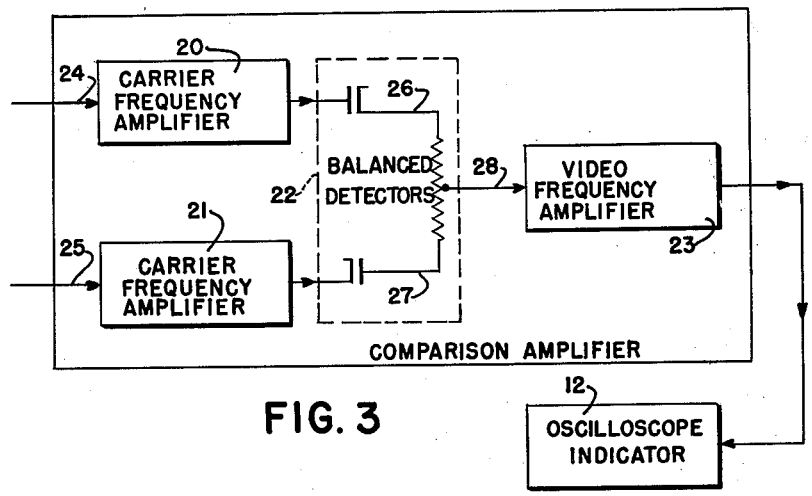
Fig. 3 is a block diagram of a part of this invention.
Figure 4:
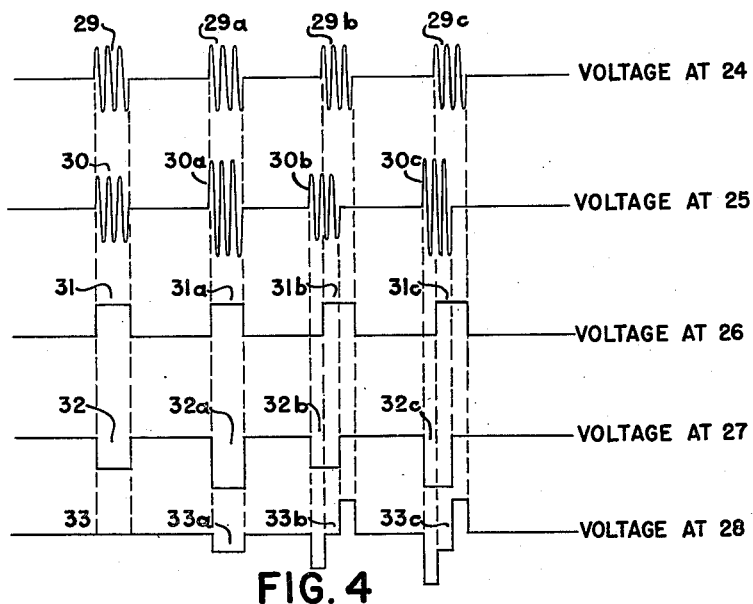
Fig. 4 shows certain voltage wave forms of various parts of Fig. 3.

This comparison amplifier is preferably of the type shown in Fig. 3. This amplifier is composed of two identical carrier frequency amplifiers 20 and 21 whose outputs are connected to two balanced detectors 22. The output of detectors 22 may be further amplified by video frequency amplifier 23 and then applied to oscilloscope indicator 12. The action of the comparison amplifier is best explained by reference to Fig. 4. A short pulse of carrier frequency voltage is applied to amplifier 20 and similarly to amplifier 21. After amplification these pulses are fed to balanced detectors 22 which produce positive and negative video pulses, one polarity from each input. These video pulses are combined and the difference is applied to amplifier 23. If the two input pulses are the same amplitude and in the same time relationship, as pulses 29 and 30, then the detector outputs 31 and 32 will be equal and of opposite polarity and the output 33 will be zero. If the two input pulses are of different amplitude as pulses 29a and 30a, then the detector outputs will have different amplitudes, as 31a and 32a and there will be an output 33a whose polarity will depend upon which of the original pulses is the larger. If the two input pulses are not in the same time relationship, as pulses 29b and 30b then the detector outputs will be displaced as 31b and 32b and the output 33b will be a double pulse having positive and negative portions. If the input pulses are different in amplitude and time relationship, as 29c and 30c then the output will be as 33c. Changes in amplitude and in the time required for the passage of the supersonic pulses through the test part will thus be shown on indicator 12 and such changes may be attributed to changes in dimension and/or to the existence of flaws in the test part.

A method of testing, using the embodiment of the invention as shown in Fig. 1, would include the following steps. Place a standard part between transducers 13 and 15. Adjust the frequency of trigger generator 10 and the gain of amplifiers 20 and 21, Fig. 3, until the indicator 12 shows zero output from comparison amplifier 16. Replace the standard part with a test part. If indicator 12 still shows zero output then the test part is identical with the standard part. If the indicator shows an output other than zero then the test part is different from the standard part in either dimension and/or internal conditions. The interpretation of the signal on the indicator will depend somewhat on a study of the article to be tested aided by a knowledge of the nature of the transmission of supersonic waves through a solid object. If the signal passes through a standard part in a certain length of time but passes through the test part in a time that is longer by a small fraction of the total passage time, the difference in time may be attributed to the fact that the test part is slightly longer than the standard part. Again, if echoes occur at certain positions in time in the signal from the standard part but a signal appears in an isolated and wholly unrelated position in time in the signal from the test part, it is obvious that this signal may be due to some discontinuity in the test part not found in the standard part. This discontinuity may be a change in material which will result in a corresponding change in the velocity of propagation and change in the attenuation of the signal passing therethrough or it may be a crack or void in the test part which may cause a partial reflection of the energy striking the flaw. The partially reflected energy may reach the receiving transducer by a different path than that followed by the unreflected energy and thereby cause an additional signal to appear on the indicator at an unexpected location.

It is well known that any changes in the velocity of propagation exhibited by the transmission medium along the path of the pulse will result in refraction or partial or total reflection of the energy. Therefore, the time of arrival and also the amplitude of the signals on the indicator may be studied to indicate the exact nature of the deviation of the test part from the standard part.

It should be understood, however, that such a study is required only where it is desired to determine the nature of the deviation. In production testing of parts, a part might be rejected if it showed any signals not present in the standard part regardless of what caused the extra signals.

Figure 2:
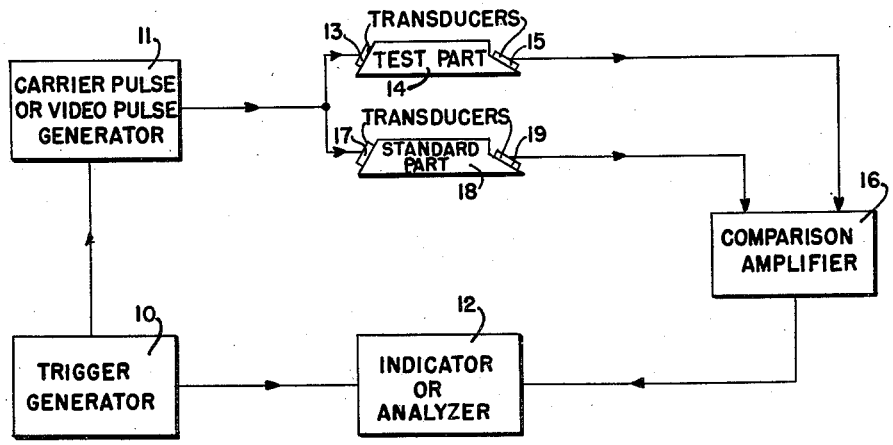
Fig. 2 is a block diagram of a further embodiment of this invention.

The preferred embodiment of the invention is shown in Fig. 2. Here trigger generator 10, pulse generator 11, indicator or analyzer 12, and comparison amplifier 16 are the same and have the same functions as the embodiment in Fig. 1. The trigger period of trigger generator 10 as embodied in Fig. 2 is, however, not critical, but if it is made long enough to allow echoes in the sample to die out between pulses the interpretation of the results will be simplified.

In this embodiment of the invention the electrical pulse from pulse generator 11 is applied to transducers 13 and 17 which project supersonic pulses through test part 14 and standard part 18 simultaneously. These supersonic pulses and the echoes developed in the standard and test parts are picked up by transducers 15 and 19 and applied to the two inputs of comparison amplifier 16. Thus the indicator will show deviations of the time required for projection of the pulse through the two parts and will also show deviations of the amplitude and time position of echoes developed in the two parts.

Figure 5:
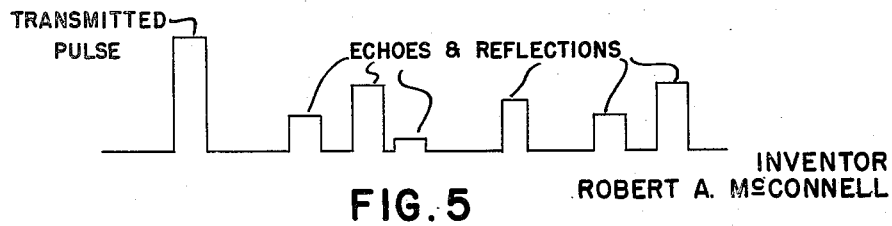
Fig. 5 is a certain voltage wave form of a point of Fig. 3.

A method of testing, using the embodiment of the invention as shown in Fig. 2, would include the following steps. Place a standard part between one pair of transducers (as 18 between 17 and 19) and place a test part between the other pair of transducers (as 14 between 13 and 15). If indicator 12 shows zero output from comparison amplifier 16 the two parts are identical, if there is an output from the comparison amplifier it will indicate that the parts are different. A very accurate indication may be made of all the dimensions of the tested parts if the transducers are placed on the parts in such a way that there will be reflections or echoes from all the surfaces of the parts. As an example refer to Fig. 5. There is shown a typical idealized voltage wave form that would occur at point 26, Fig. 3, the first pulse being the direct transmitted pulse and subsequent pulses the reflections from various boundaries of the part through which the pulse is projected. Depending upon the orientation of the transducers, the direct transmitted pulse may or may not be received. As explained before if both parts are identical and the amplifier is properly balanced the outputs from the detectors will cancel and the indication will be zero. Any deviation between the parts will produce an unbalance in the amplifier and consequently an output. It is readily seen that each echo or reflection can be predicted from the contours of the tested parts and therefor a deviation in one dimension of the test part will cause certain reflections to change in time phase and/or amplitude. Thus with a calibrated chart such as Fig. 5 any indication appearing on indicator 12 will show what dimension is in error and approximately by how much. An indication that appears on an uncharted portion of the indicator can be attributed to reflections from a flaw in the test part.

The embodiment of the invention as shown in Fig. 2 may be modified within the scope of this invention by eliminating transducers 15 and 19 and connecting the inputs to comparison amplifier 16 directly to transducers 13 and 17, thus using the same transducers for transmitting and receiving.

The invention described in the foregoing specification need not be limited to the details as shown, which are considered to be illustrative of forms the invention may take.

What is claimed is:

1. A supersonic test device comprising in combination an electrical pulse generator, first and second electromechanical transducers arranged to receive a test part therebetween, said first transducer coupled to said electrical pulse generator and adapted to convert said electrical signals from said pulse generator into mechanical signals within said test part and said second transducer being adapted to receive mechanical signals from said test part and convert said received mechanical signals into corresponding electrical signals, the interval between pulses generated by said pulse generator being substantially equal to the time required for a pulse to travel from said first transducer to said second transducer through a part of standard length and material, an amplifier coupled to said pulse generator and said second transducer and adapted to provide an output indicative of the instantaneous difference between signals from said pulse generator and said second transducer and an indicator adapted to display the voltage-time wave shape of the output of said amplifier.

2. A supersonic test device comprising in combination, an electrical pulse generator, first and second electromechanical transducers arranged to receive a test part therebetween, said first transducer being adapted to convert electrical signals from said pulse generator into mechanical signals within said test part and said second transducer being adapted to receive mechanical signals from said test part and to convert said received mechanical signals into corresponding electrical signals, third and fourth electromechanical transducers arranged to receive a standard part therebetween, said third transducer being adapted to convert electrical signals from said pulse generator into mechanical signals in a standard part simultaneously with the operation of said first transducer and said fourth transducer being adapted to receive mechanical signals and to convert said signals into corresponding electrical signals, an amplifier adapted to receive signals from said second and fourth transducers and to provide an output indicative of the instantaneous difference between the two input signals and means for displaying the wave shape of the output of said amplifier, said wave shape being indicative of any irregularities in said test part.

3. Apparatus for inspecting and measuring a solid part comprising means for generating a supersonic wave train, means for simultaneously impressing said wave train on a selected point on said part and on a corresponding point on a standard, means for receiving at a second point on said part a second wave train resulting from the transmission of said first wave train through said part, means for receiving at a point on said standard corresponding to said second point on said part a third wave train resulting from the transmission of said first wave train through said standard, and means for combining said second and third wave trains, said last-mentioned means providing a signal indicative of the differences, if any, between the amplitude and time of occurrence of pulses in said second train and the amplitude and time of occurrence of pulses in said third train.

4. A supersonic test device comprising in combination, a source of electrical pulses, first and second electromechanical transducers arranged to receive a test part therebetween, said first transducer being coupled to said pulse source and adapted to convert electrical signals from said pulse source into mechanical signals within said test part, said second transducer being adapted to receive mechanical signals from said test part and to convert said received mechanical signals into corresponding electrical signals, signal comparison means having first and second inputs thereto, said first input being coupled to said second transducer, means coupling said pulse source to said second input, said signal comparison means providing an output signal indicative of the instantaneous difference between the signals applied at the said two inputs thereof, and an indicator coupled to the output of said signal comparison means for displaying said output signal.

5. A test device as in claim 4, wherein said source of pulse signals is coupled directly to said signal comparison means.

6. A test device as in claim 4 wherein said source of pulse signals is coupled directly to said signal comparison means and wherein the period between successive pulses from said pulse source is equal to the desired time of transmission of a mechanical signal from said first transducer to said second transducer through said test part.

7. A test device as in claim 4 wherein said means coupling said pulse source to said second input comprises a third and a fourth electromechanical transducer arranged to receive a standard part therebetween, said third transducer being coupled to said pulse source and said fourth transducer being coupled to said second input of said signal comparison means.

8. A supersonic test device comprising in combination, a supersonic pulse generating means, and a supersonic pulse receiving means arranged to receive a test part therebetween to conduct supersonic energy pulses from said generating means to said receiving means, a signal comparison means having first and second inputs thereto, said signal comparison means providing an output signal indicative of the instantaneous difference between the signals applied at the said two imputs, means coupling said first input to said pulse generating means, means coupling said second input to said pulse receiving means, and an indicator coupled to the output of said signal comparison means.

9. A supersonic test device comprising in combination, a supersonic pulse generating means and a supersonic pulse receiving means arranged to receive a test part therebetween to conduct supersonic energy pulses from said generating means to said receiving means, the interval between pulses generated by said generating means being substantially equal to the time required for a pulse to travel through a test part of a preselected length and material, a signal comparison means having first and second inputs thereto, said signal comparison means providing an output signal indicative of the instantaneous difference between the signals applied at said two inputs, means coupling said first input to said pulse generating means, means coupling said second input to said pulse receiving means, and an indicator coupled to the output of said signal comparison means.

10. A supersonic test device comprising in combination, a source of electrical pulses, a carrier pulse generator coupled to said source of electrical pulses, first and second electromechanical transducers arranged to receive a test part therebetween, said first transducer being coupled to said carrier pulse generator and adapted to convert carrier frequency signals from said carrier pulse generator into mechanical signals within said test part, said second transducer being adapted to receive mechanical signals from said test part and to convert said received mechanical signals into corresponding electrical signals, signal comparison means having first and second inputs thereto, said first input being coupled to said second transducer, means coupling said carrier pulse generator to said second input, said signal comparison means providing an output signal indicative of selected differences between signals applied at the two inputs thereof and an indicator coupled to the output of said signal comparison means for displaying said output signal.

11. A test device comprising in combination, means for generating pulses whose energy is at least predominantly in the supersonic region, means for receiving said pulses, said generating and receiving means being arranged to receive a test part therebetween to conduct said pulses from said generating means to said receiving means, a signal comparison means having first and second inputs thereto, means coupling said pulse generating means to said first input, means coupling said receiving means to said second input, said comparison means being adapted to effect cancellation of pulse signals simultaneously applied to said two inputs and an indicator coupled to the output of said signal comparison means.

12. A supersonic test device comprising in combination first and second supersonic pulse generating means and first and second pulse receiving means arranged to receive a test part between said first generating means and said first receiving means and a stardard part between said second generating means and said second receiving means, signal comparison means having first and second inputs thereto, said signal comparison means providing an output signal indicative of the instantaneous difference between the signals applied at said two inputs, means coupling said first and second receiving means to said first and second inputs, respectively, and an indicator coupled to the output of said signal comparison means.

ROBERT A. McCONNELL.

REFERENCES CITED

The following references are of record in the file of this patent:

UNITED STATES PATENTS

| Number | Name | Date |
|---|---|---|
| 2,010,189 | Hallowell | Aug. 6, 1935 |
| 2,280,226 | Firestone | Apr. 21, 1942 |
| 2,378,237 | Morris | June 12, 1945 |
| 2,461,543 | Gunn | Feb. 15, 1949 |
| 2,527,208 | Berry et al. | Oct. 24, 1950 |